(12) United States Patent
Saitou

(10) Patent No.: US 8,556,524 B2
(45) Date of Patent: Oct. 15, 2013

(54) OPTICAL COMMUNICATION MODULE

(75) Inventor: Takahito Saitou, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 421 days.

(21) Appl. No.: 12/936,991

(22) PCT Filed: Dec. 15, 2008

(86) PCT No.: PCT/JP2008/003763
§ 371 (c)(1),
(2), (4) Date: Oct. 8, 2010

(87) PCT Pub. No.: WO2009/125456
PCT Pub. Date: Oct. 15, 2009

(65) Prior Publication Data
US 2011/0026936 A1    Feb. 3, 2011

(30) Foreign Application Priority Data
Apr. 9, 2008 (JP) .............................. P2008-101811

(51) Int. Cl.
*G02B 6/36* (2006.01)
*G02B 6/32* (2006.01)

(52) U.S. Cl.
USPC .............................................. 385/93; 385/33

(58) Field of Classification Search
None
See application file for complete search history.

(56) References Cited

U.S. PATENT DOCUMENTS

| | | | |
|---|---|---|---|
| 6,071,016 A | 6/2000 | Ichino et al. | |
| 6,432,733 B1 * | 8/2002 | Hashizume | 438/22 |
| 6,547,455 B1 | 4/2003 | Hashizume | |
| 6,793,406 B1 * | 9/2004 | Edwards et al. | 385/88 |
| 7,036,998 B2 * | 5/2006 | Tonai et al. | 385/88 |
| 8,118,498 B2 * | 2/2012 | Sasada et al. | 385/93 |
| 2001/0055451 A1 * | 12/2001 | Kuhara et al. | 385/93 |

(Continued)

FOREIGN PATENT DOCUMENTS

| | | |
|---|---|---|
| EP | 1 681 729 A1 | 7/2006 |
| JP | 58-168024 | 10/1983 |

(Continued)

OTHER PUBLICATIONS

Korean Office Action in counterpart Korean Application No. 10-2010-7023774 dated Sep. 26, 2012.

(Continued)

*Primary Examiner* — Tina Wong
(74) *Attorney, Agent, or Firm* — Finnegan, Henderson, Farabow, Garrett & Dunner, L.L.P.

(57) ABSTRACT

To reduce optical axis misalignment in an optical communication module, the optical communication module 1 includes a photoelectric conversion element package 10 to which a photoelectric conversion element 12 of either one of a light emitting element and a light receiving element is fitted so as to face one side 11a of a resin housing 11, and an optical fiber coupler 20 mounted on the one side 11a of the resin housing 11 so as to be coupled with an optical fiber, in which the optical fiber 20 coupler includes a metal lens-holding plate 22 holding a lens 23 arranged opposite to the photoelectric conversion element 12, and a resin lens-holding frame 21 that is mounted on the one side 11a of the resin housing 11 and that houses the lens 23 held on the metal lens-holding plate 22 in a light transmission hole 21a1 formed therein, so that the lens 23 is aligned with an optical axis K of the photoelectric conversion element 12.

12 Claims, 12 Drawing Sheets

(56) References Cited

U.S. PATENT DOCUMENTS

| | | |
|---|---|---|
| 2005/0174767 A1 | 8/2005 | Flaherty et al. |
| 2005/0175300 A1* | 8/2005 | Tanaka .......................... 385/93 |
| 2008/0187272 A1* | 8/2008 | Sato ............................... 385/93 |

FOREIGN PATENT DOCUMENTS

| | | |
|---|---|---|
| JP | 02-275913 | 11/1990 |
| JP | 05-264874 | 10/1993 |
| JP | 09-033768 | 2/1997 |
| JP | 09-145963 | 6/1997 |
| JP | 2003-207693 | 7/2003 |
| JP | 2005-326884 | 11/2005 |
| JP | 2007520890 A | 7/2007 |
| WO | WO 2005/076793 A2 | 8/2005 |

OTHER PUBLICATIONS

Chinese Office Action in counterpart Chinese Application No. 200880128568.4 dated Apr. 6, 2012.

International Search Report from the European Patent Office for International Application No. PCT/JP2008/003763 (Mail date Apr. 6, 2009).

Office Action in related Japanese Application No. 2008-101811; dated Apr. 16, 2013; Ref. No. YZK-6537 Issue No. 238444 (4 pgs.).

* cited by examiner

OPTICAL COMMUNICATION MODULE

TECHNICAL FIELD

The present invention relates to an optical communication module for optically coupling an optical fiber and a photoelectric conversion element package with each other.

BACKGROUND ART

In optical communication that can transmit optical information obtained by photoelectrically converting large-volume digital information at a high speed by using an optical fiber, an optical communication module is used for optically coupling the optical fiber with a photoelectric conversion element of either one of a light emitting element and a light receiving element fitted in the photoelectric conversion element package.

As this type of optical communication module (optical module), various structural forms have been developed. As a conventional example, there is one in which an aspherical lens and a holder are integrally molded from plastic, and a photoelectric conversion element package is housed opposite to the aspherical lens in a cylindrical portion of the holder (for example, see Patent Citation 1).

FIG. 1 is a longitudinal sectional view showing a conventional optical module.

The conventional optical module 100 shown in FIG. 1 is disclosed in Patent Citation 1, and is explained briefly with reference to Patent Citation 1.

As shown in FIG. 1, the conventional optical module 100 includes a photoelectric conversion element package 110 in which a photoelectric conversion element 112 is fitted to one side 111a of a housing 111, and a holder 115 arranged on the one side 111a of the housing 111 of the photoelectric conversion element package 110 for being coupled with an optical fiber (not shown), and including an aspherical lens 115g integrally molded therewith (which is described later). The holder 115 is assembled so as to be engaged with upper and lower sides 111b and 111c of the housing 111 of the photoelectric conversion element package 110.

First, in the photoelectric conversion element package 110, a photoelectric conversion element 112 of either one of a semiconductor light emitting element (semiconductor laser) and a semiconductor light receiving element (photo diode), is fitted to the one side 111a of the housing 111, and a lead 113 connected to the photoelectric conversion element 112 is protruded from the other side 111d, which is opposite to the one side 111a of the housing 111.

Next, the holder 115 is formed by injection molding, using light transmitting plastic (for example, PEI, PC, or PMMA). A stepped hole 115b with a bottom for fitting the optical fiber is formed on one side 115a, and the other end face 115c is formed as a cylindrical portion 115d. A depression 115e is formed for housing the photoelectric conversion element package 110 inside of the cylindrical portion 115d, and the aspherical lens 115g is integrally molded on a partition wall 115f positioned between the stepped hole 115b with a bottom and the depression 115e, so that a convex curve of the aspherical lens 115g protrudes into the depression 115e.

Further, the holder 115 and the photoelectric conversion element package 110 are engaged with each other and assembled together, so that when the photoelectric conversion element package 110 is housed in the depression 115e of the holder 115, the aspherical lens 115g integrally molded in the holder 115 faces the photoelectric conversion element 112 fitted to the one side 111a of the housing 111 of the photoelectric conversion element package 110 with a gap therebetween, an apex P1 and a focal point P2 of the aspherical lens 115g are on an optical axis K of the photoelectric conversion element package 110, and the focal point P2 of the aspherical lens 115g approximately matches a light emitting point or a light receiving point of the photoelectric conversion element 112.

According to the conventional optical module 100, therefore, even if ambient temperature changes, the position of the focal point P2 of the aspherical lens 115g integrally molded in the holder 115 approximately matches the light emitting point or the light receiving point of the photoelectric conversion element 112 fitted to the one side 111a of the housing 111 of the photoelectric conversion element package 110. Therefore, optical coupling efficiency is improved, thereby enabling efficient optical communication. The foregoing is described in Patent Citation 1.

Patent Citation 1: Japanese Patent Application Laid-open No. 2005-326884

DISCLOSURE OF INVENTION

Technical Problem

In the conventional optical module 100, the number of parts can be reduced by integrally molding the aspherical lens 115g in the holder 115. However, when the holder 115 and the photoelectric conversion element package 110 are engaged with each other to form the optical module 100, the position of the focal point P2 of the aspherical lens 115g integrally molded in the holder 115 may not always match the light emitting point or the light receiving point of the photoelectric conversion element 112 fitted to the one side 111a of the housing 111 of the photoelectric conversion element package 110.

This is because when the holder 115 is injection molded by using the light transmitting plastic (for example, PEI, PC, or PMMA), thermal deformation may occur in the holder 115 immediately after injection molding or deformation may occur therein due to a temperature change when the holder 115 is used at a high temperature or at a low temperature, thereby causing deformation in the aspherical lens 115g integrally molded in the holder 115. Accordingly, the position of the apex P1 or the position of the focal point P2 of the aspherical lens 115g may deviate from the optical axis K of the photoelectric conversion element package 110.

Therefore, when the aspherical lens 115g integrally molded in the holder 115 is deformed, there is a problem in that satisfactory optical communication cannot be realized by using the conventional optical module 100.

Further, because a resin material having high optical transparency needs to be used for the holder 115 in order to integrally mold the aspherical lens 115g, the holder 115 becomes expensive.

Therefore, such an optical communication module is desired that a lens in a resin lens-holding frame mounted on the one side of the resin housing for being coupled with the optical fiber does not cause optical axis misalignment with respect to the optical axis of the photoelectric conversion element, when the optical communication module is constructed including the photoelectric conversion element package to which a photoelectric conversion element of either one of the light emitting element and the light receiving element is fitted so as to face one side of the resin housing, and the optical fiber coupler in which the lens is housed in a light transmission hole formed in the resin lens-holding frame.

Technical Solution

The present invention has been made in view of the problems above mentioned, and a first invention provides an optical communication module comprising a photoelectric conversion element package to which a photoelectric conversion element of either one of a light emitting element and a light receiving element is fitted so as to face one side of a resin housing, and an optical fiber coupler mounted on the one side of the resin housing so as to be coupled with an optical fiber, wherein in the optical fiber coupler, a lens is housed in a light transmission hole formed in a resin lens-holding frame mounted on the one side of the resin housing via a metal lens-holding plate, so that the lens is aligned with an optical axis of the photoelectric conversion element.

A second invention provides an optical communication module comprising a photoelectric conversion element package to which a photoelectric conversion element of either one of a light emitting element and a light receiving element is fitted so as to face one side of a resin housing, and an optical fiber coupler mounted on the one side of the resin housing so as to be coupled with an optical fiber, wherein the optical fiber coupler comprises: a metal lens-holding plate that holds a lens arranged to face the photoelectric conversion element; and a resin lens-holding frame that is mounted on the one side of the resin housing and that houses the lens held on the metal lens-holding plate in a light transmission hole formed therein, so that the lens is aligned with an optical axis of the photoelectric conversion element.

According to a third invention, in the optical communication module according to the first or second invention, the metal lens-holding plate comprises an outer frame having a fitting hole formed therein, to which a guide pin of a mold is fitted, a lens holding section that holds the lens, and a plurality of stays for connecting the outer frame and the lens holding section with each other, and at least the outer frame is detached after the lens held on the metal lens-holding plate is housed in the resin lens-holding frame.

According to a fourth embodiment, in the optical communication module according to any one of the first to third inventions, the metal lens-holding plate has a lens holding section for molding and holding the lens, with an outer circumferential portion of the lens holding section, which holds the lens, being buried in the resin lens-holding frame.

According to a fifth invention, in the optical communication module according to the fourth invention, the metal lens-holding plate has a plurality of inside and outside connecting holes for connecting an inside and an outside of the metal lens-holding plate by a resin material of the resin lens-holding frame, in the outer circumferential portion of the lens holding section buried in the resin lens-holding frame.

According to a sixth invention, in the optical communication module according to any one of the first to fifth inventions, the resin lens-holding frame is formed by connecting a cylindrical portion having the light transmission hole formed therein for coupling with the optical fiber with a rectangular solid portion that is mounted on one side of the resin housing, and in which the metal lens-holding plate holding the lens is buried.

According to a seventh invention, in the optical communication module according to the sixth invention, when the resin lens-holding frame of the optical fiber coupler is mounted on the resin housing of the photoelectric conversion element package, the lens holding section of the metal lens-holding plate is formed in a rectangular shape, a positioning hole is bored through the lens holding section at each corner portion thereof so that each positioning hole is exposed at each corner portion of the rectangular solid portion of the resin lens-holding frame, a positioning boss is formed by extrusion at each corner portion on the one side of the resin housing formed in a rectangular solid shape, and after each of the positioning bosses is fitted to each of the positioning holes, the resin lens-holding frame and the resin housing are bonded by heat welding.

According to an eighth invention, in the optical communication module according to the sixth invention, when the resin lens-holding frame of the optical fiber coupler is mounted on the resin housing of the photoelectric conversion element package, a positioning hole is bored through either one of the rectangular solid portion of the resin lens-holding frame and the resin housing formed in a rectangular solid shape at each corner portion thereof, and a positioning boss is formed by extrusion on the other thereof at each corner portion, and after each positioning boss is fitted to each positioning hole, the resin lens-holding frame and the resin housing are bonded by heat welding.

Advantageous Effects

According to the optical communication module of the present invention, when the optical communication module includes the photoelectric conversion element package to which the photoelectric conversion element of either one of the light emitting element and the light receiving element is fitted so as to face the one side of the resin housing, and the optical fiber coupler mounted on the one side of the resin housing for being coupled with an optical fiber, particularly the optical fiber coupler houses the lens held on the metal lens-holding plate in the light transmission hole formed in the resin lens-holding frame so as to be aligned with the optical axis of the photoelectric conversion element. Therefore, the lens is held on the metal lens-holding plate, which is not thermally deformed, and the lens is housed in the resin lens-holding frame, in a state of the metal lens-holding plate being buried in the resin lens-holding frame, and hence, optical axis misalignment does not occur at all.

Because the lens is a separate body from the resin lens-holding frame, the resin material having high optical transparency need not be used at the time of molding the resin lens-holding frame, and by using an existing resin material, the resin lens-holding frame can be molded at a low cost.

Further, the metal lens-holding plate has an outer frame having a fitting hole formed therein, to which a guide pin of a mold is fitted, a lens holding section that holds the lens, and a plurality of stays for connecting the outer frame and the lens holding section. Therefore, the lens can be positioned and held on the metal lens-holding plate by outsert molding using a mold of an injection molding machine, and the outer circumferential portion of the metal lens-holding plate, which holds the lens, can be positioned and buried in the resin lens-holding frame by insert molding using the mold of the injection molding machine.

Further, the metal lens-holding plate includes a plurality of inside and outside connecting holes for connecting an inside and an outside of the metal lens-holding plate using a resin material of the resin lens-holding frame, in the outer circumferential portion of the lens holding section buried in the resin lens-holding frame. Therefore, it can be prevented that the metal lens-holding plate comes out from the resin lens-holding frame.

Furthermore, when the resin lens-holding frame of the optical fiber coupler is mounted on the resin housing of the photoelectric conversion element package, the resin lens-holding frame and the resin housing are bonded by heat welding after positioning holes and positioning bosses provided respectively at corner portions of a rectangular solid portion of the resin lens-holding frame and corner portions of the resin housing formed in a rectangular solid shape are fitted to each other. Therefore, optical axis misalignment does not occur and a rigid optical communication module can be provided.

EXPLANATION OF REFERENCE

Figure 1:
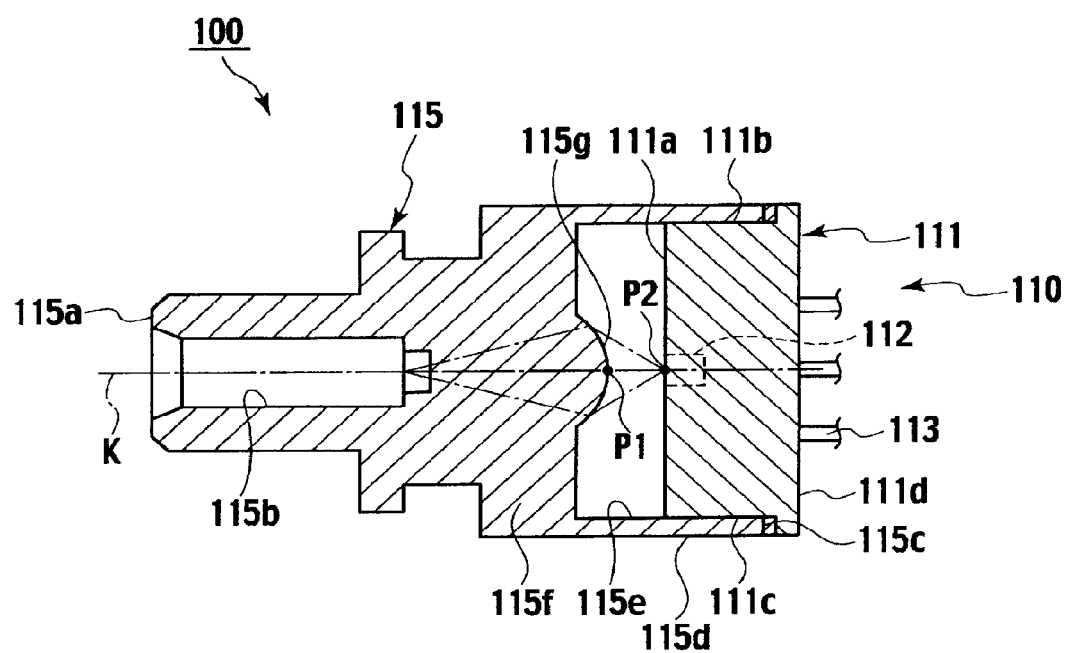
FIG. 1 is a longitudinal sectional view of a conventional optical module.

1 Optical communication module according to the first embodiment
1A Optical communication module according to the second embodiment
10 Photoelectric conversion element package according to the first embodiment
10A Photoelectric conversion element package according to the second embodiment
11 Resin housing according to the first embodiment
11A Resin housing according to the second embodiment
11a One side
11b Rectangular depression
11c Positioning hole with bottom
11d Bottom face
11e Positioning boss
12 Photoelectric conversion element
13 Driving IC
14 Substrate
15 Lead terminal
20 Optical fiber coupler according to the first embodiment
20A Optical fiber coupler according to the second embodiment
21 Resin lens-holding frame according to the first embodiment
21A Resin lens-holding frame according to the second embodiment
21a Cylindrical portion
21a1 Light transmission hole
21b Rectangular solid portion
21b1 Light transmission hole
21b2 Front face
21b3 Rear face
21b4 Positioning boss
21b5 Notch
22 Metal lens-holding plate according to the first embodiment
22A Metal lens-holding plate according to the second embodiment
22a Outer frame portion
22b Guide-pin fitting round hold
22c Stay (Support)
22c1 Narrow stay portion
22c2 Wide stay portion
22d Ring-shaped lens holding section
22e Inside and outside connecting long hole
22f Lens-fitting round hold
22g Rectangular lens holding section
22h Positioning round hole
23 High heat-resistant lens
23a Flat surface
23b Intermediate portion
23c Concave curved face
K Optical axis of photoelectric conversion element

BEST MODE FOR CARRYING OUT THE INVENTION

Embodiments of an optical communication module according to the present invention are explained in detail with reference to FIGS. 2 to 13, in order of a first embodiment and a second embodiment.

First Embodiment

Figure 2:
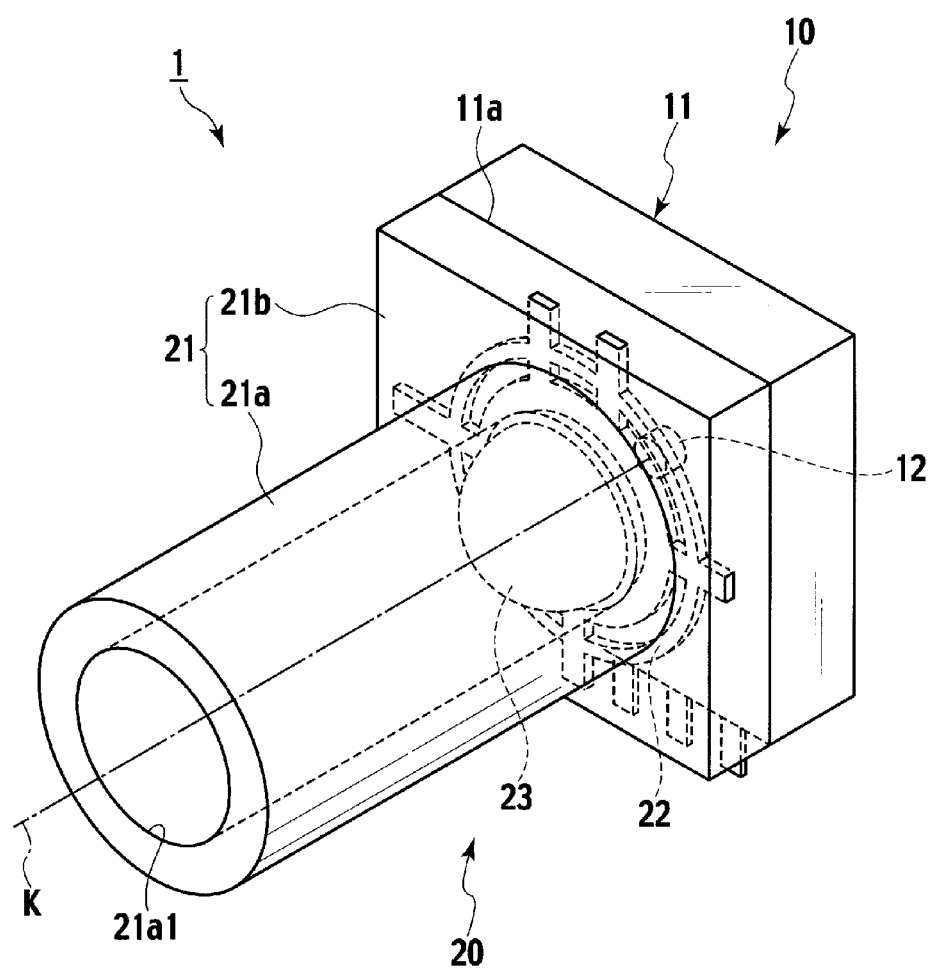
FIG. 2 is a perspective view of an optical communication module according to a first embodiment of the present invention.
Figure 3:
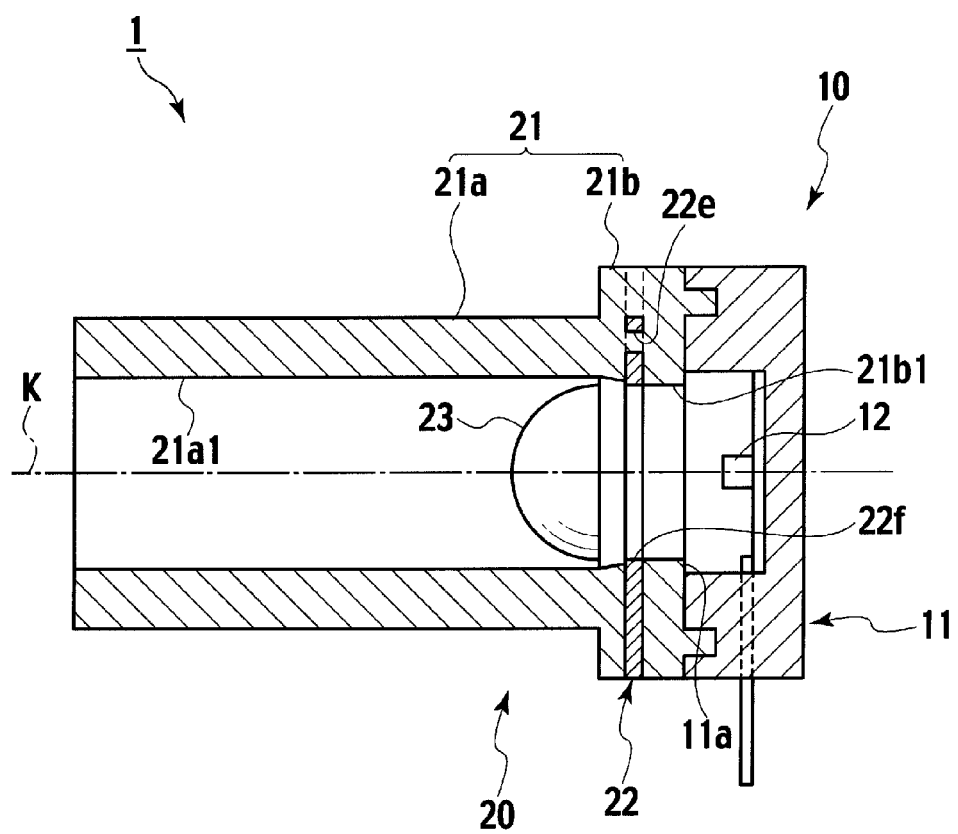
FIG. 3 is a longitudinal sectional view of the optical communication module according to the first embodiment of the present invention.

FIG. 2 is a perspective view of an optical communication module according to the first embodiment, and FIG. 3 is a longitudinal sectional view showing the optical communication module according to the first embodiment.

As shown in FIGS. 2 and 3, an optical communication module 1 according to the first embodiment of the present invention includes a photoelectric conversion element package 10, to which a photoelectric conversion element 12 of either one of a light emitting element and a light receiving element is fitted so as to face one side 11a of a resin housing 11 formed in a rectangular solid shape, and an optical fiber coupler 20 integrally assembled by insert molding so that a high heat-resistant lens 23 held on a metal lens-holding plate 22 is housed in a resin lens-holding frame 21 so as to be aligned with an optical axis K of the photoelectric conversion element 12. The resin lens-holding frame 21 includes a cylindrical portion 21a for being coupled with an optical fiber (not shown) and a rectangular solid portion 21b to be mounted on the one side 11a of the resin housing 11.

In the first embodiment, when the resin housing 11 of the photoelectric conversion element package 10 is coupled with the resin lens-holding frame 21 of the optical fiber coupler 20, as described later, positioning is performed by fitting a positioning hole and a positioning boss to each other, and the resin housing 11 and the resin lens-holding frame 21 are bonded and coupled by an adhesive.

The optical fiber coupler 20 is the relevant part of the first embodiment. In the cylindrical portion 21a of the resin lens-holding frame 21 in the optical fiber coupler 20, a light transmission hole 21a1 is formed for inserting or deinserting the optical fiber (not shown). The metal lens-holding plate 22 holding the high heat-resistant lens 23 is buried in the rectangular solid portion 21b, and a light transmission hole 21b1 (shown only in FIG. 2) is formed behind this.

The resin lens-holding frame 21 of the optical fiber coupler 20 is then mounted on the one side 11a of the resin housing 11 of the photoelectric conversion element package 10, so that the high heat-resistant lens 23 held on the metal lens-holding plate 22 faces the light transmission hole 21a1 formed in the cylindrical portion 21a of the resin lens-holding frame 21. When the high heat-resistant lens 23 is positioned opposite to the photoelectric conversion element 12 in the photoelectric conversion element package 10 with a gap via the light transmission hole 21b1 (shown only in FIG. 3) formed in the rectangular solid portion 21b of the resin lens-holding frame 21, the high heat-resistant lens 23 is held on the metal lens-holding plate 22, which does not cause thermal deformation, in the resin lens-holding frame 21 so that the lens 23 does not cause optical axis misalignment with respect to the optical axis K of the photoelectric conversion element 12.

Respective constituent elements constituting the optical communication module 1 according to the first embodiment are explained sequentially with reference to FIGS. 4 to 9.

Figure 5:
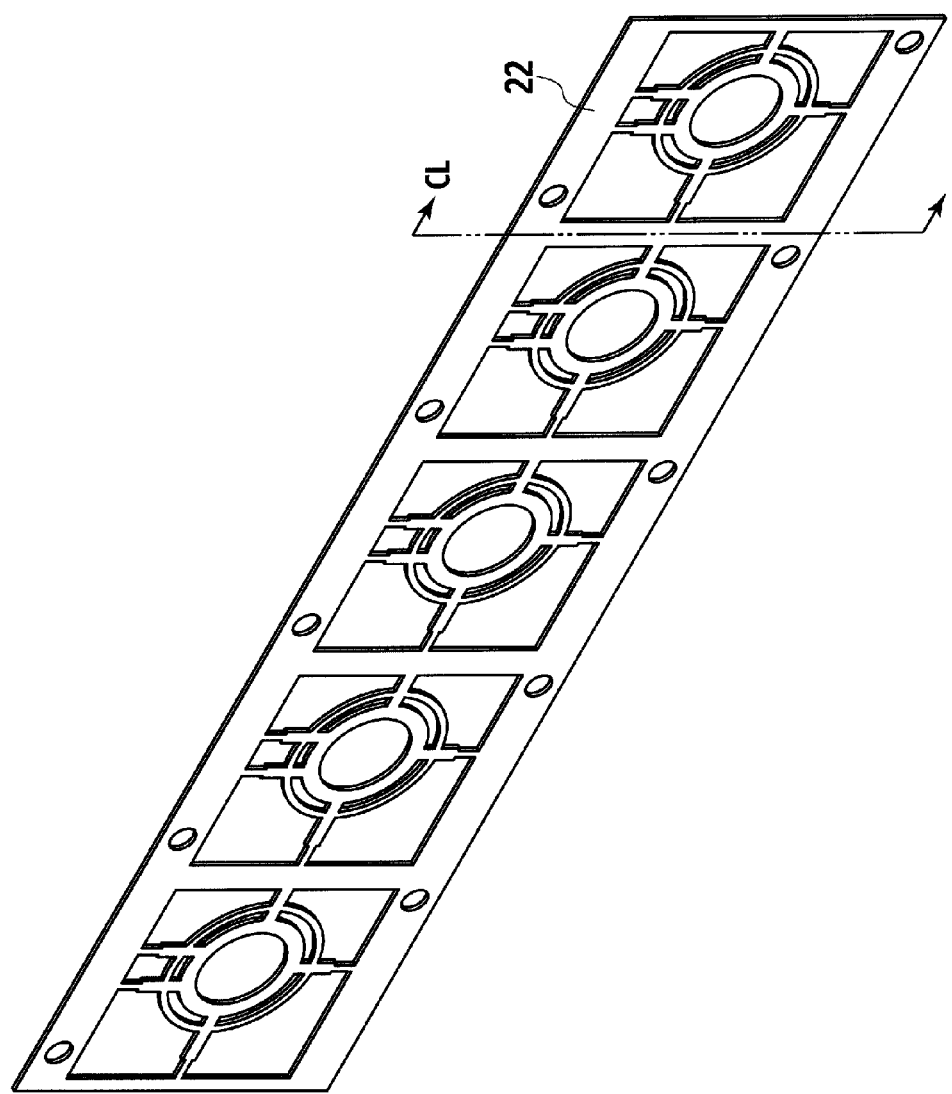
FIG. 5 is a perspective view showing a state where a metal lens-holding plate shown in FIGS. 2 and 3 is manufactured.
Figure 6:
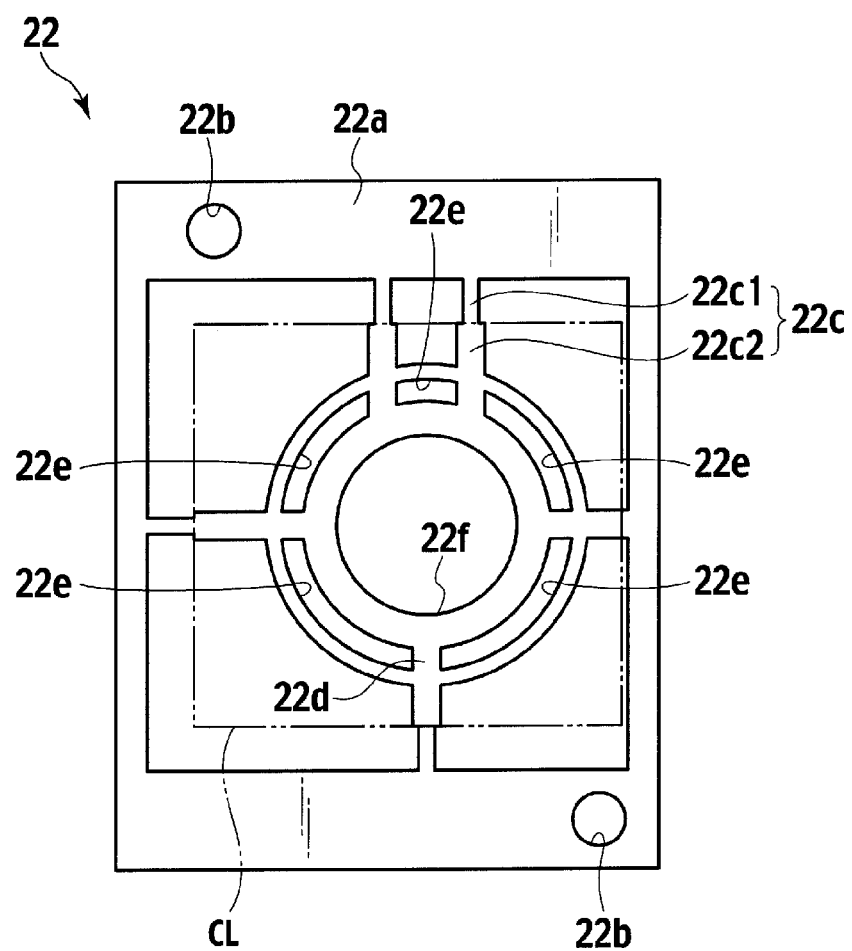
FIG. 6 is a front elevation of the metal lens-holding plate shown in FIGS. 2, 3, and 5 in an enlarged scale.
Figure 7:
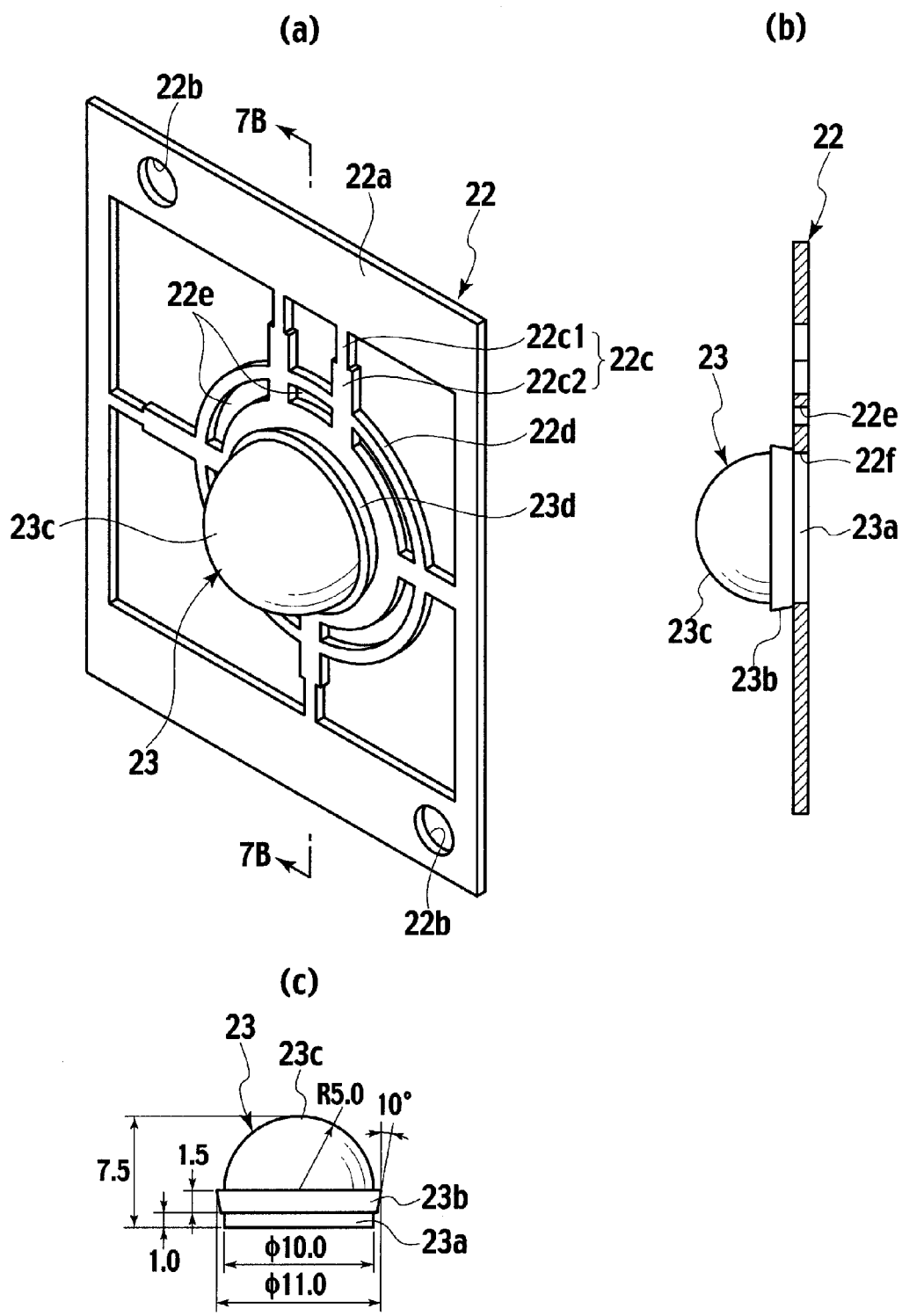
FIG. 7(a) is a perspective view.
FIG. 7(b) is a sectional view along the line 7B-7B.
FIG. 7(c) shows a lens body for explaining a state where a high heat-resistant lens 23 shown in FIGS. 2 and 3 is molded on the metal lens-holding plate.
Figure 8:
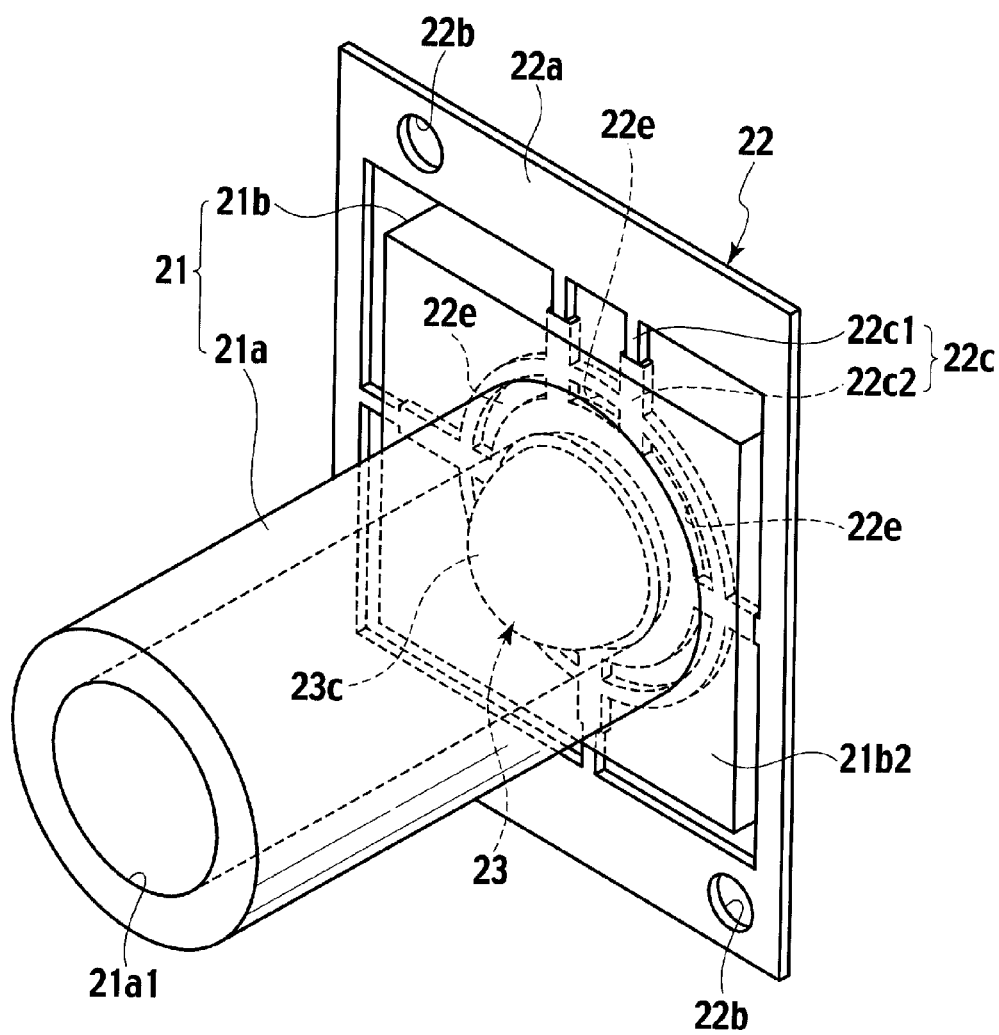
FIG. 8 is a perspective view for explaining a state where the metal lens-holding plate holding the high heat-resistant lens is buried in a resin lens-holding frame shown in FIGS. 2 and 3.
Figure 9:
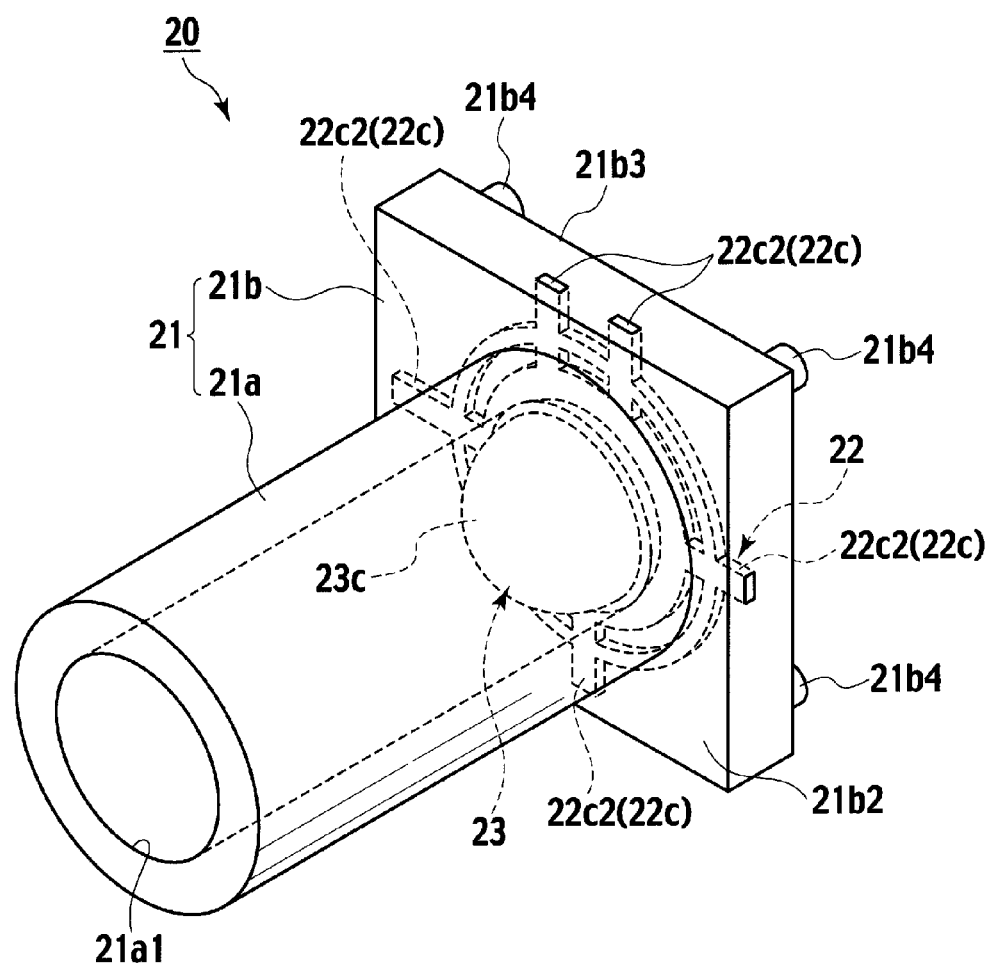
FIG. 9 is a perspective view of an optical fiber coupler shown in FIGS. 2 and 3.

FIGS. 4(a) and 4(b) are respectively a perspective view and a front elevation for explaining the photoelectric conversion element package shown in FIGS. 2 and 3. FIG. 5 is a perspective view showing a state where the metal lens-holding plate shown in FIGS. 2 and 3 is manufactured. FIG. 6 is a front elevation showing the metal lens-holding plate shown in FIGS. 2, 3, and 5 in an enlarged scale. FIGS. 7(a), 7(b), and 7(c) are respectively a perspective view, a sectional view along the line 7B-7B, and a diagram of a lens body for explaining a state where the high heat-resistant lens 23 shown in FIGS. 2 and 3 is molded on the metal lens-holding plate. FIG. 8 is a perspective view for explaining a state where the metal lens-holding plate holding the high heat-resistant lens is buried in the resin lens-holding frame shown in FIGS. 2 and 3. FIG. 9 is a perspective view of the optical fiber coupler shown in FIGS. 2 and 3.

Figure 4:
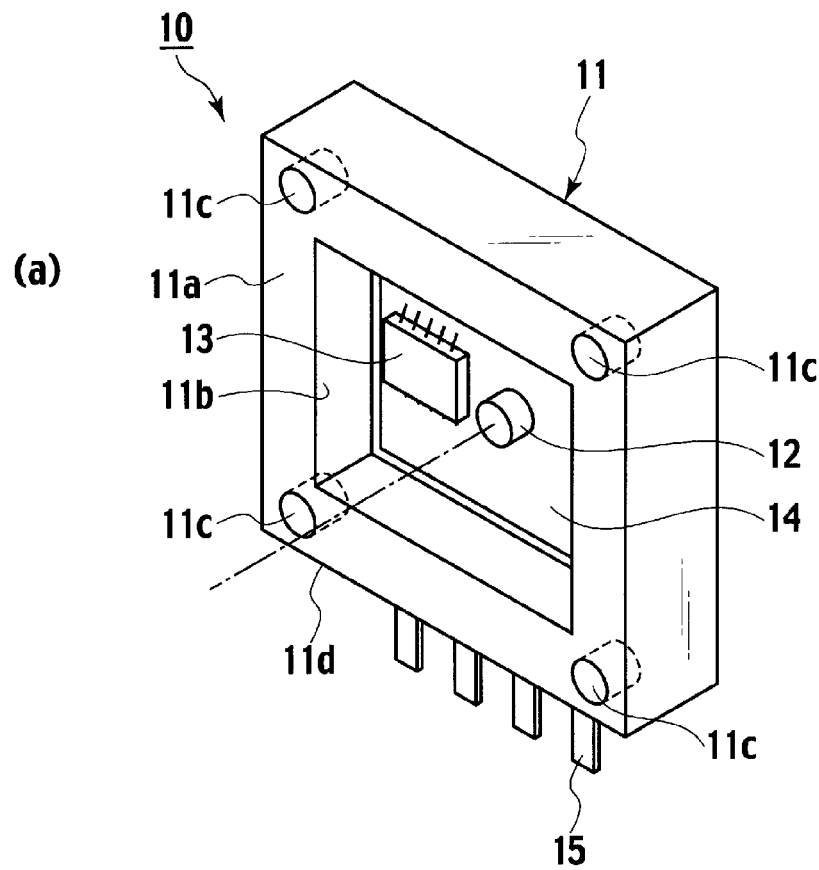
FIGS. 4a & 4b are perspective views and a front elevation for explaining a photoelectric conversion element package shown in FIGS. 1 and 2.
Figure 4:
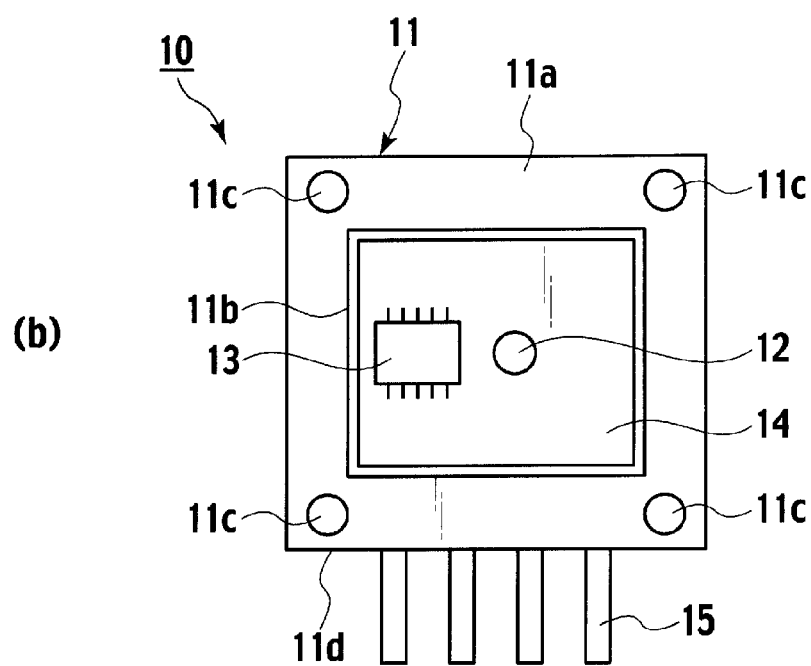

In the photoelectric conversion element package 10, as shown in FIG. 4, a rectangular depression 11b is formed in a central part of the one side 11a of the resin housing 11 formed in the rectangular solid shape by using a resin material, and a positioning hole 11c with a bottom for fitting the positioning boss 21b4 (FIG. 9) of the resin lens-holding frame 21 is respectively formed at four corner portions on the one side 11a.

Further, in the rectangular depression 11b formed on the one side 11a of the resin housing 11, the photoelectric conversion element 12 of either one of the light emitting element and the light receiving element, and a driving IC 13 for driving the photoelectric conversion element 12 are fitted in a state of being soldered on a substrate 14 so as to face the one side 11a of the resin housing 11, and a plurality of lead terminals 15 connected to the substrate 14 is protruded from a bottom face 11d of the resin housing 11.

When the light emitting element is to be applied as the photoelectric conversion element 12, an LED (Light Emitting Diode) or a VCSEL (Vertical Cavity Surface Emitting Laser) is used for the light emitting element. On the other hand, when the light receiving element is to be applied as the photoelectric conversion element 12, a PD (Photo Diode) is used for the light receiving element.

As shown in FIG. 5, the metal lens-holding plate 22 for holding the high heat-resistant lens 23 (FIGS. 2 and 3) is manufactured by using a metal plate such as an iron plate, a stainless plate, or a brass plate having rigidity with a thickness of about 1 mm as a molding carrier, punching a plurality of metal lens-holding plates 22 continuously in the molding carrier by press working, and separating one of these along a cutting-plane line (CL) shown by a two-dot chain line.

Specifically, as enlargedly shown in FIG. 6, in the metal lens-holding plate 22, an outer frame portion 22a is punched in a rectangular shape using a metal plate, and guide-pin fitting round holes 22b for fitting guide pins of a mold (not shown) thereto are bored through the outer frame portion 22a at diagonal corner portions in upper and lower parts thereof, and a ring-shaped lens holding section 22d is formed inside of the outer frame 22a via a plurality of stays (supports) 22c.

At this time, five stays 22c in total, that is, two above, one each at left and right of, and one below the outer circumference of the ring-shaped lens holding section 22d, are connected between the outer frame 22a and the ring-shaped lens holding section 22d in the metal lens-holding plate 22, and portions other than the five stays 22c are punched to form cavities.

In the stay 22c, a narrow stay portion 22c1 connected to the outer frame 22a with a narrow width and a wide stay portion 22c2 connected to the ring-shaped lens holding section 22d with a wide width are connected to each other. As described later, by cutting a connecting portion between the narrow stay portion 22c1 and the wide stay portion 22c2 along a cutting-plane line (CL) shown by a two-dot chain line, the inside of the frame shown by the two-dot chain line is finally used as the metal lens-holding plate 22 for holding the high heat-resistant lens 23 (FIGS. 2 and 3). Up to the wide stay portion 22c2 including the ring-shaped lens holding section 22d of the metal lens-holding plate 22 is regarded as the outer circumferential portion of the ring-shaped lens holding section 22d to be buried in the resin lens-holding frame (FIGS. 2 and 3).

Further, in the outer circumferential portion of the ring-shaped lens holding section 22d for holding the high heat-resistant lens 23 (FIGS. 2 and 3), a plurality of inside and outside connecting long holes 22e is bored through along the circumference of the ring-shaped lens holding section 22d, and a lens-fitting round hole 22f is bored through inside of the plural inside and outside connecting long holes 22e.

The plural inside and outside connecting long holes 22e have, as described later, a function of connecting the inside and the outside of the metal lens-holding plate 22 by a resin material of the resin lens-holding frame 21, at the time of performing insert molding of the metal lens-holding plate 22 in the resin lens-holding frame 21 (FIGS. 2 and 3). On the other hand, the lens-fitting round hole 22f has a function of fixing a flat surface 23a (FIG. 7) of the high heat-resistant lens 23 (FIGS. 2 and 3).

A central position of the lens-fitting round hole 22f is approximately symmetrical with respect to a vertical direction of the outer frame 22a; however, is deviated toward the right in the drawing with respect to a lateral direction of the outer frame 22a. It is because the position is matched with the position of the photoelectric conversion element 12 fitted in the photoelectric conversion element package 10 explained with reference to FIG. 4.

As shown in FIGS. 7(a) and 7(b), the high heat-resistant lens 23 is manufactured by outsert molding on the metal lens-holding plate 22 explained next with reference to FIG. 6, by using a transparent resin material having high heat resistance, and the outsert molding is for molding the resin on the metal lens-holding plate 22 as a workpiece.

The metal lens-holding plate 22 used here is the one before the outer frame 22a is detached from the connecting portions between the narrow stay portions 22c1 and the wide stay portions 22c2 of the stays 22c. The high heat-resistant lens 23 held on the metal lens-holding plate 22 is positioned and molded by inserting guide pins provided in a mold of an injection molding machine (not shown) into the guide-pin fitting round holes 22b bored on the upper and lower parts in the outer frame 22a for positioning the metal lens-holding plate 22.

Thereafter, when a high heat-resistant resin material melted for molding the high heat-resistant lens 23 is injected into the mold (not shown), the melted high heat-resistant resin material is poured into the lens-fitting round hole 22f formed inside of the ring-shaped lens holding section 22d of the metal lens-holding plate 22 to mold the flat face 23a of the high heat-resistant lens 23, so that an intermediate portion 23b and a convex curved face 23c of the high heat-resistant lens 23 protrude forward than the metal lens-holding plate 22. Therefore, the high heat-resistant lens 23 is integrally held by the ring-shaped lens holding section 22d of the metal lens-holding plate 22.

At this time, in the mold (not shown), it is designed that the melted high heat-resistant resin material is not poured into the inside and outside connecting long holes 22e formed in the ring-shaped lens holding section 22d of the metal lens-holding plate 22.

As shown in FIG. 7(c), because the high heat-resistant lens 23 is formed for the light emitting element as the photoelectric conversion element 12 (FIGS. 2 to 4), the flat face 23a is opposite to the light emitting element, and the convex curved face 23c is formed so that the light from the light emitting element entering from the flat face 23a is made to exit toward the optical fiber side (not shown) via the intermediate portion 23b, and the convex curved face 23c is formed of, for example, R5.0.

When the light receiving element is applied as the photoelectric conversion element 12 (FIGS. 2 to 4), the high heat-resistant lens needs only to be formed such that the convex curved face side (not shown) faces the light receiving element.

As shown in FIG. 8, the resin lens-holding frame 21 is manufactured by insert molding, as explained with reference to FIG. 7, by fitting the metal lens-holding plate 22 integrally holding the high heat-resistant lens 23 into the mold of the injection molding machine (not shown) as a workpiece, and the insert molding is performed by containing the workpiece in the resin.

The resin lens-holding frame 21 is formed separately from the high heat-resistant lens 23 having the optical transparency. Therefore, a resin material having high optical transparency need not be used, and an existing resin material can be used for molding the resin lens-holding frame 21 at a low cost.

Also in this case, the metal lens-holding plate 22 is the one before the outer frame 22a is detached from the connecting portions between the narrow stay portions 22c1 and the wide stay portions 22c2 of the stays 22c, and positioning of the metal lens-holding plate 22 with respect to the resin lens-holding frame 21 is performed by inserting the guide pins provided in the mold of the injection molding machine (not shown) into the guide-pin fitting round holes 22b bored through the outer frame 22a in the upper and lower parts thereof.

Thereafter, when a melted resin material is injected into the mold (not shown) to mold the resin lens-holding frame 21, the cylindrical portion 21a having the light transmission hole 21a1 is formed in a long shape on the convex curved face 23c side of the high heat-resistant lens 23, and the metal lens-holding plate 22 holding the high heat-resistant lens 23 is buried in the rectangular solid portion 21b up to the wide stay portions 22c2 of the plural stays 22c, and the cylindrical portion 21a is connected to a front face 21b2 of the rectangular solid portion 21b.

Further, because the melted resin material is also poured into the inside and outside connecting long holes 22e formed in the metal lens-holding plate 22, the inside and the outside of the metal lens-holding plate 22 are connected to each other by the melted resin material poured into the inside and outside connecting long holes 22e, in the rectangular solid portion 21b of the resin lens-holding frame 21, it can be prevented that the metal lens-holding plate 22 comes out from the resin lens-holding frame 21.

Thereafter, when the narrow stay portions 22c1 of the metal lens-holding plate 22 exposed outside of the resin lens-holding frame 21 and the outer frame 22a connected to the narrow stay portions 22c1 are cut, as shown in FIG. 9, the optical fiber coupler 20 can be obtained, which is the relevant part of the first embodiment.

In the optical fiber coupler 20, an optical fiber (not shown) is attachable to and detachable from the light transmission hole 21a1 formed in the cylindrical portion 21a of the resin lens-holding frame 21, and the metal lens-holding plate 22 holding the high heat-resistant lens 23 is buried in the rectangular solid portion 21b of the resin lens-holding frame 21. Accordingly, because the high heat-resistant lens 23 is housed in the resin lens-holding frame 21 via the metal lens-holding plate 22, which is not thermally deformed, the optical axis misalignment does not occur at all.

When the positioning bosses 21b4 formed by extrusion at four corner portions on a rear face 21b3 of the rectangular solid portion 21b of the resin lens-holding frame 21 are fitted into the positioning holes 11c with bottoms formed at four corner portions on the one side 11a of the resin housing 11 explained with reference to FIG. 4, and bonded by an adhesive to couple with each other, the resin housing 11 in the photoelectric conversion element package 10 and the high heat-resistant lens 23 held on the metal lens-holding plate 22 in the resin lens-holding frame 21 of the optical fiber coupler 20 are in a well aligned state with the optical axis K of the photoelectric conversion element 12. Accordingly, the optical communication module 1 according to the first embodiment of the present invention shown in FIGS. 2 and 3 can be obtained.

Second Embodiment

Figure 10:
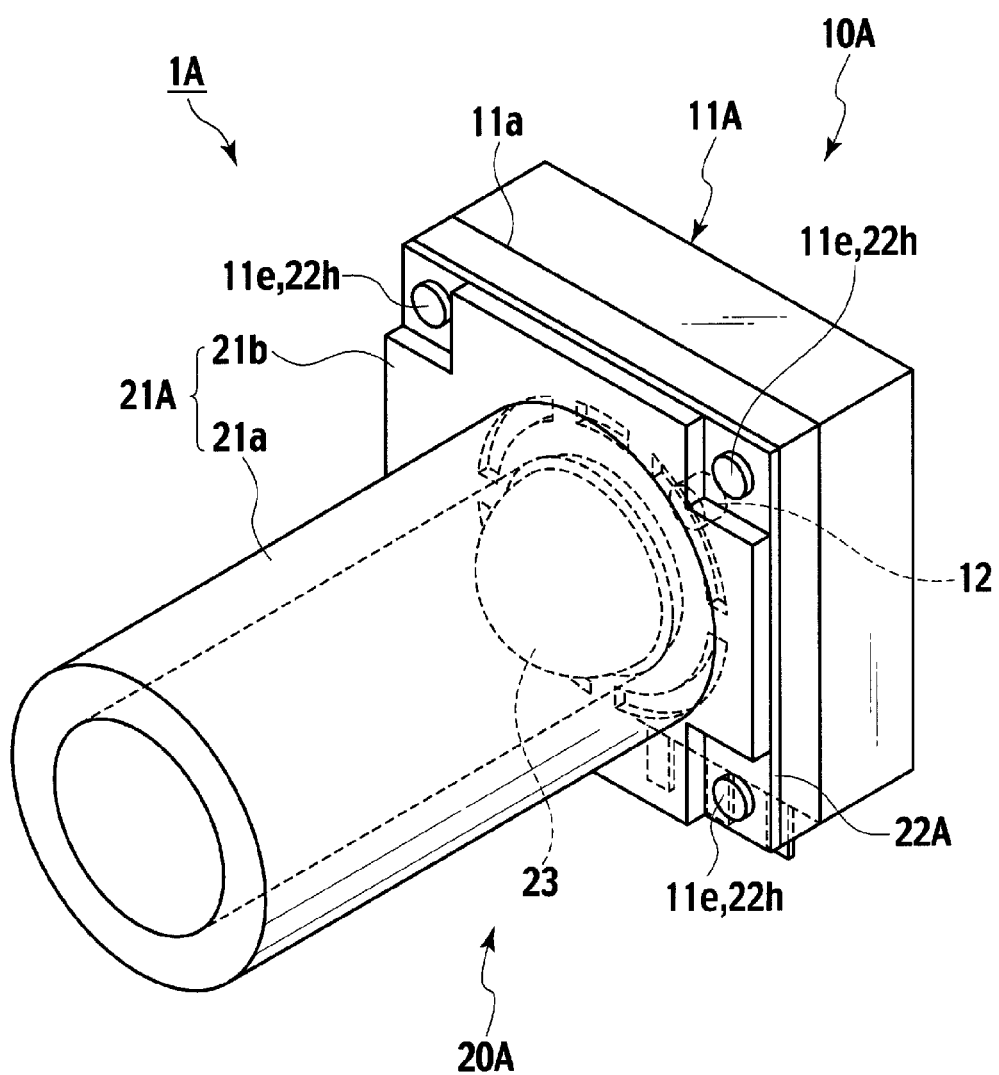
FIG. 10 is a perspective view of an optical communication module according to a second embodiment of the present invention.
Figure 11:
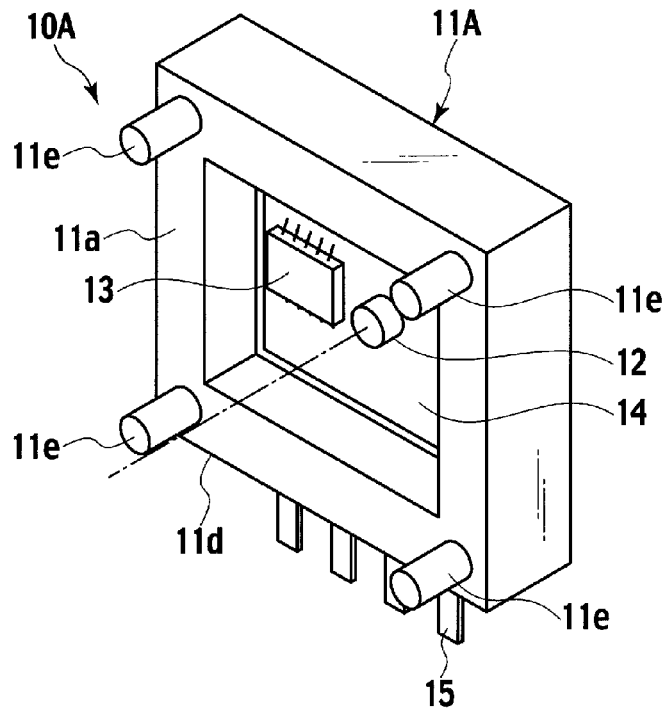
FIG. 11 is a perspective view for explaining a photoelectric conversion element package shown in FIG. 10.
Figure 12:
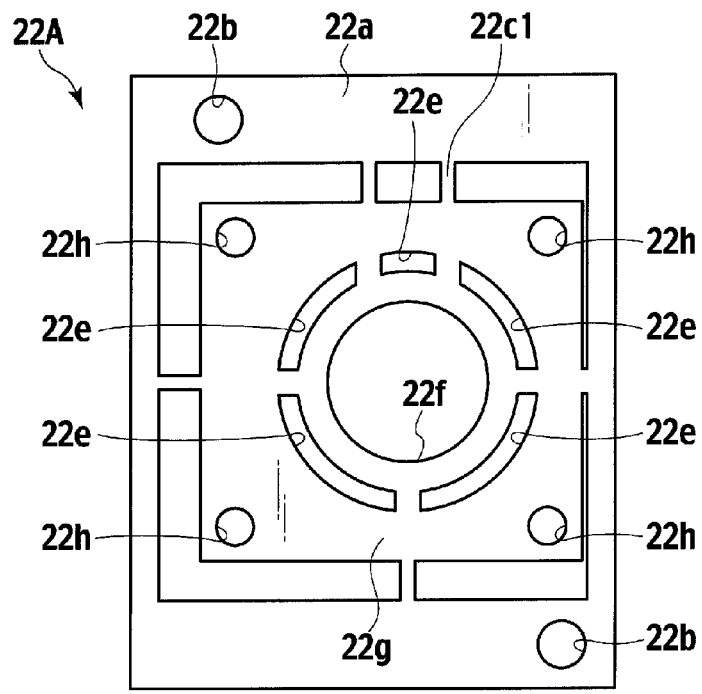
FIG. 12 is a front elevation of a metal lens-holding plate shown in FIG. 10 in an enlarged scale.
Figure 13:
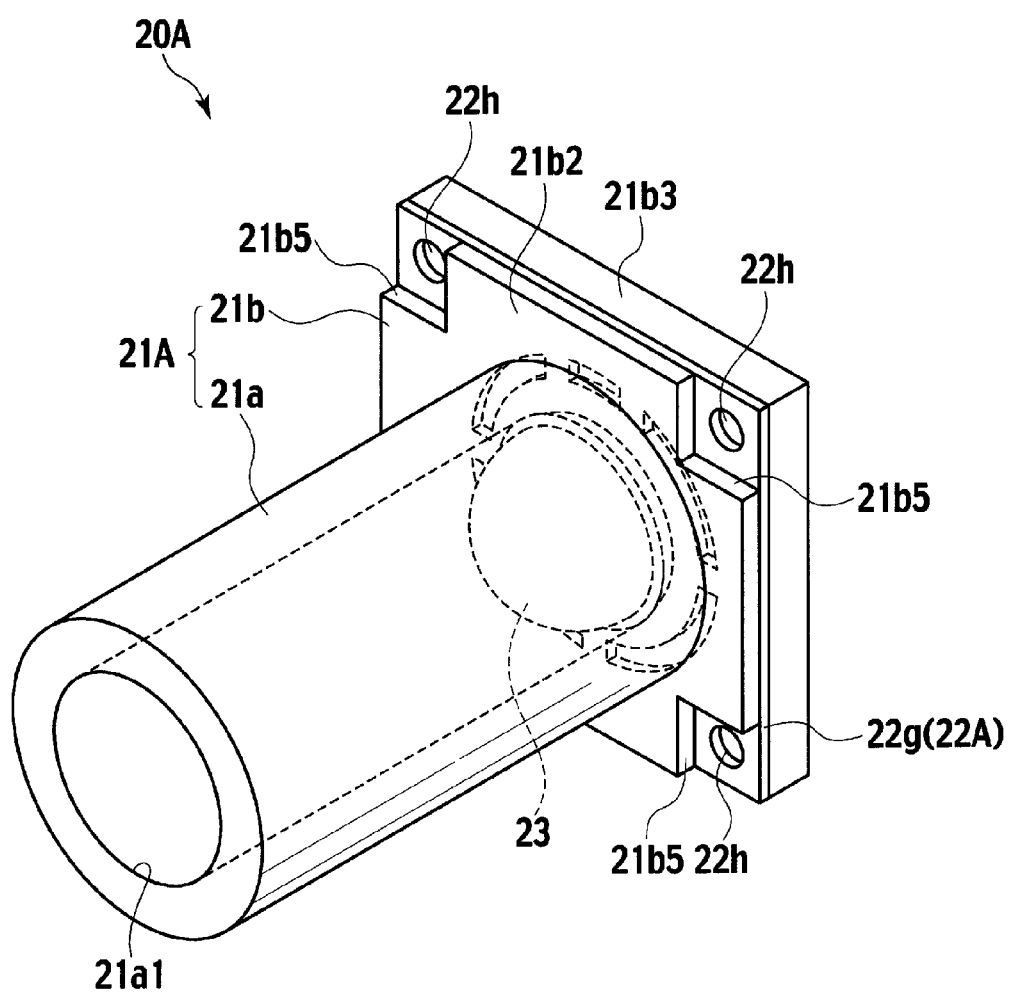
FIG. 13 is a perspective view of the optical fiber coupler shown in FIG. 10.

FIG. 10 is a perspective view of an optical communication module according to a second embodiment of the present invention, FIG. 11 is a perspective view for explaining a photoelectric conversion element package shown in FIG. 10, FIG. 12 is a front elevation of a metal lens-holding plate shown in FIG. 10 in an enlarged scale, and FIG. 13 is a perspective view of an optical fiber coupler shown in FIG. 10.

An optical communication module 1A according to the second embodiment shown in FIG. 10 has the same configuration as that of the optical communication module 1 according to the first embodiment explained above with reference to FIGS. 2 and 3, except a part thereof. For the sake of explanation, like reference numerals refer to like constituent elements, and detailed explanations thereof will be omitted. However, new reference numerals are used for constituent elements different from those of the first embodiment, and different points are mainly explained briefly.

As shown in FIG. 10, the optical communication module 1A according to the second embodiment also includes, substantially like in the first embodiment, a photoelectric conversion element package 10A, to which the photoelectric conversion element 12 of either one of the light emitting element and the light receiving element is fitted so as to face one side 11a of a resin housing 11A formed in a rectangular solid shape, and an optical fiber coupler 20A integrally assembled by insert molding so that the high heat-resistant lens 23 held on a metal lens-holding plate 22A is housed in a resin lens-holding frame 21A so as to be aligned with the optical axis K of the photoelectric conversion element 12. The resin lens-holding frame 21A includes the cylindrical portion 21a for being coupled with an optical fiber (not shown) and the rectangular solid portion 21b to be mounted on the one side 11a of the resin housing 11A.

The different point from the first embodiment is that in the second embodiment, when the resin housing 11A of the photoelectric conversion element package 10A is coupled with the resin lens-holding frame 21A of the optical fiber coupler 20A, positioning is performed by fitting between the positioning holes and the positioning bosses, and the resin housing 11A and the resin lens-holding frame 21A are bonded by heat welding, as described later.

Accompanying this, the resin housing 11A of the photoelectric conversion element package 10A, and the resin lens-holding frame 21A and the metal lens-holding plate 22A of the optical fiber coupler 20A have shapes that can be heat welded, and respective constructional elements are explained below sequentially.

As shown in FIG. 11, the photoelectric conversion element package 10A is the same as that of the first embodiment in that the photoelectric conversion element 12 of either one of the light emitting element and the light receiving element is fitted so as to face the one side 11a of the resin housing 11 formed in the rectangular solid shape using a resin material. However, a different point from the first embodiment is that the positioning bosses 11e to be fitted to the positioning round holes 22h (FIG. 12) in the metal lens-holding plate 22A are formed by extrusion at four corner portions on the one side 11a of the resin housing 11.

As shown in FIG. 12, in the metal lens-holding plate 22A for holding the high heat-resistant lens 23 (FIG. 10), the guide-pin fitting round holes 22b for fitting guide pins of a mold (not shown) thereto are bored through the outer frame 22a at diagonal corner portions in upper and lower parts thereof, and a rectangular lens holding section 22g is formed inside of the outer frame 22a via a plurality of narrow stays portions 22c1.

In the second embodiment, it is different from the first embodiment that the rectangular lens holding section 22g is formed in the metal lens-holding plate 22A, and the positioning holes 22h are bored through the rectangular lens holding section 22g at the four corner portions thereof.

As in the first embodiment, in the second embodiment, the high heat-resistant lens 23 (FIG. 10) is manufactured by outsert molding on the metal lens-holding plate 22A. When the outer periphery of the rectangular lens holding section 22g of the metal lens-holding plate 22A holding the high heat-resistant lens 23 (FIG. 10) is buried in the resin lens-holding frame 21A (FIG. 10), the plurality of narrow stay portions 22c1 and the outer frame 21a can be cut off along the outer periphery of the rectangular lens holding section 22g.

As shown in FIG. 13, the resin lens-holding frame 21A of the optical fiber coupler 20A is, as in the first embodiment, manufactured by insert molding by fitting the metal lens-holding plate 22 integrally holding the high heat-resistant lens 23 into the mold of the injection molding machine (not shown) as a workpiece. In the second embodiment, however, it is different from the first embodiment that a notch 21b5 is respectively formed at four corner portions on the front face 21b2 of the rectangular solid portion 21b of the resin lens-holding frame 21A so that the positioning round hole 22h bored through the rectangular lens holding section 22g of the metal lens-holding plate 22A respectively at the four corner portions thereof is exposed, and the rear face 21b3 of the rectangular solid portion 21b of the resin lens-holding frame 21A is formed in a flat face.

After the respective positioning bosses 11e formed by extrusion on the one side 11a of the resin housing 11A are fitted into the respective positioning round holes 22h in the metal lens-holding plate 22A exposed on the front face 21b2 of the rectangular solid portion 21b of the resin lens-holding frame 21A, the positioning round holes 22h and the positioning bosses 11e are bonded by heat welding. The resin housing 11A of the photoelectric conversion element package 10A and the high heat-resistant lens 23 held on the metal lens-holding plate 22A in the resin lens-holding frame 21A of the optical fiber coupler 20A are then well aligned with the optical axis K of the photoelectric conversion element 12, and firmly bonded. Accordingly, the optical communication module 1A according to the second embodiment of the present invention shown in FIG. 10 can be obtained.

In the second embodiment, the optical fiber coupler 20 can be formed by using the metal lens-holding plate 22 explained in the first embodiment, and the resin housing 11 of the photoelectric conversion element package 10 and the resin lens-holding frame 21 of the optical fiber coupler 20 can be bonded by heat welding by performing positioning so that these are aligned with the optical axis K of the photoelectric conversion element 12. In this case, the positioning holes are respectively bored at either ones of the respective corner portions of the resin housing 11 formed in the rectangular solid shape and the respective corner portions of the rectangular solid portion 21b of the resin lens-holding frame 21, and the positioning bosses are respectively formed at the other ones, and the respective positioning bosses are fitted into the respective positioning holes and then the both members can be bonded by heat welding.

The entire contents of Japanese Patent Application No. 2008-101811 (filed Apr. 9, 2008) are incorporated herein by reference.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

The invention claimed is:

1. An optical communication module, comprising:
a photoelectric conversion element package to which a photoelectric conversion element of either one of a light emitting element and a light receiving element is fitted so as to face one side of a resin housing; and an optical fiber coupler mounted on the one side of the resin housing so as to be coupled with an optical fiber, wherein in the optical fiber coupler, a lens is housed in a light transmission hole formed in a resin lens-holding frame mounted on the one side of the resin housing via a metal lens-holding plate, so that the lens is aligned with an optical axis of the photoelectric conversion element, wherein the metal lens-holding plate comprises an outer frame having a fitting hole formed therein, to which a guide pin of a mold is fitted;

a lens holding section that holds the lens; and a plurality of stays for connecting the outer frame and the lens holding section with each other; and wherein at least the outer frame is detached after the lens held on the metal lens-holding plate is housed in the resin lens-holding frame.

2. The optical communication module according to claim 1, wherein the lens holding section is for molding and holding the lens; and wherein an outer circumferential portion of the lens holding section which holds the lens, is buried in the resin lens-holding frame.

3. The optical communication module according to claim 2, wherein the metal lens-holding plate has a plurality of inside and outside connecting holes for connecting an inside and an outside of the metal lens-holding plate by a resin material of the resin lens-holding frame, in the outer circumferential portion of the lens holding section buried in the resin lens-holding frame.

4. The optical communication module according to claim 1, wherein the resin lens-holding frame comprises:

a cylindrical portion having the light transmission hole formed therein for coupling with the optical fiber; and a rectangular solid portion that is mounted on one side of the resin housing, the rectangular solid portion is buried with the metal lens-holding plate which holds the lens; and wherein the resin lens-holding frame is formed by connecting the cylindrical portion with the rectangular solid portion.

5. The optical communication module according to claim 1, wherein when the resin lens-holding frame of the optical fiber coupler is mounted on the resin housing of the photoelectric conversion element package, the lens holding section of the metal lens-holding plate is formed in a rectangular shape;

a positioning hole is bored through the lens holding section at each corner portion thereof so that each positioning hole is exposed at each corner portion of the rectangular solid portion of the resin lens-holding frame;

a positioning boss is formed by extrusion at each corner portion on the one side of the resin housing formed in a rectangular solid shape; and after each of the positioning bosses is fitted to each of the positioning holes, the resin lens-holding frame and the resin housing are bonded by heat welding.

6. The optical communication module according to claim 2, wherein when the resin lens-holding frame of the optical fiber coupler is mounted on the resin housing of the photoelectric conversion element package, a positioning hole is bored through either one of the rectangular solid portion of the resin lens-holding frame and the resin housing formed in a rectangular solid shape at each corner portion thereof;

a positioning boss is formed by extrusion on the other thereof at each corner portion; and after each positioning boss is fitted to each positioning hole, the resin lens-holding frame and the resin housing are bonded by heat welding.

7. An optical communication module, comprising:

a photoelectric conversion element package to which a photoelectric conversion element of either one of a light emitting element and a light receiving element is fitted so as to face one side of a resin housing; and an optical fiber coupler mounted on the one side of the resin housing so as to be coupled with an optical fiber, wherein the optical fiber coupler comprises:

a metal lens-holding plate that holds a lens arranged to face the photoelectric conversion element; and a resin lens-holding frame that is mounted on the one side of the resin housing and that houses the lens held on the metal lens-holding plate in a light transmission hole formed therein, so that the lens is aligned with an optical axis of the photoelectric conversion element, wherein the metal lens-holding plate comprises an outer frame having a fitting hole formed therein, to which a guide pin of a mold is fitted;

a lens holding section that holds the lens; and a plurality of stays for connecting the outer frame and the lens holding section with each other; and wherein at least the outer frame is detached after the lens held on the metal lens-holding plate is housed in the resin lens-holding frame.

8. The optical communication module according to claim 7, wherein the lens holding section is for molding and holding the lens; and wherein an outer circumferential portion of the lens holding section which holds the lens, is buried in the resin lens-holding frame.

9. The optical communication module according to claim 8, wherein the metal lens-holding plate has a plurality of inside and outside connecting holes for connecting an inside and an outside of the metal lens-holding plate by a resin material of the resin lens-holding frame, in the outer circumferential portion of the lens holding section buried in the resin lens-holding frame.

10. The optical communication module according to claim 7, wherein the resin lens-holding frame comprises:

a cylindrical portion having the light transmission hole formed therein for coupling with the optical fiber; and a rectangular solid portion that is mounted on one side of the resin housing, the rectangular solid portion is buried with the metal lens-holding plate which holds the lens;

wherein the resin lens-holding frame is formed by connecting the cylindrical portion with the rectangular solid portion.

11. The optical communication module according to claim 7, wherein when the resin lens-holding frame of the optical fiber coupler is mounted on the resin housing of the photoelectric conversion element package, the lens holding section of the metal lens-holding plate is formed in a rectangular shape;

a positioning hole is bored through the lens holding section at each corner portion thereof so that each positioning hole is exposed at each corner portion of the rectangular solid portion of the resin lens-holding frame;

a positioning boss is formed by extrusion at each corner portion on the one side of the resin housing formed in a rectangular solid shape; and after each of the positioning bosses is fitted to each of the positioning holes, the resin lens-holding frame and the resin housing are bonded by heat welding.

12. The optical communication module according to claim 8, wherein when the resin lens-holding frame of the optical fiber coupler is mounted on the resin housing of the photoelectric conversion element package,
a positioning hole is bored through either one of the rectangular solid portion of the resin lens-holding frame and the resin housing formed in a rectangular solid shape at each corner portion thereof;
a positioning boss is formed by extrusion on the other thereof at each corner portion; and
after each positioning boss is fitted to each positioning hole, the resin lens-holding frame and the resin housing are bonded by heat welding.

* * * * *